United States Patent Office 3,301,908
Patented Jan. 31, 1967

---

3,301,908
CUPRIC CATALYST FOR THE CAUSTIC HYDROLYSIS OF AROMATIC HALIDES
Earl A. Ebach, Edward P. Merica, and Joseph C. Valenta, Midland, Mich., assignors to The Dow Chemical Company, Midland, Mich., a corporation of Delaware
No Drawing. Original application Oct. 3, 1961, Ser. No. 142,486, now Patent No. 3,247,234. Divided and this application Mar. 14, 1963, Ser. No. 270,783
1 Claim. (Cl. 260—613)

This is a division of application Serial No. 142,486, filed October 3, 1961 and now Patent No. 3,247,234.

The present invention relates to certain novel catalysts and more particularly concerns a class of catalysts having one of the following general formulas:

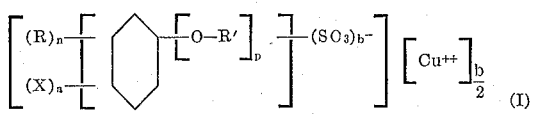

and

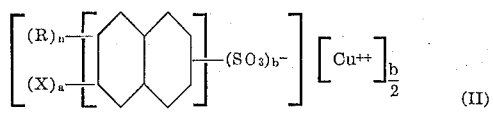

wherein R represents an aliphatic radical containing more than two carbon atoms, R' represents an aromatic radical of the benzene series or naphthalene series, $n$ represents an integer from 1 to 5, $a$ represents an integer from 0 to 2, inclusive, $p$ represents an integer from 0 to 5, $b$ represents a number from 1 to 2 when $p$ is 0, 1 to 3 when $p$ is 1, 1 to $3+p$ when $p$ is greater than 1 and X represents chlorine or bromine (i.e., a halogen having an atomic number from 17 to 35). These novel compounds have been found to be useful as a catalytic source of copper in, for example, the caustic hydrolysis of aromatic halides or the Ullmann ether synthesis and the like. It has been further observed that the copper salts of this invention promote or otherwise improve the character of the copper, reduce deposit build-up on reactor walls and materially reduce the quantity of copper required The new compounds are prepared by reacting a copper, cuprous or cupric compound or mixtures thereof with alkylated aromatic sulfonate having one of the generic formulas:

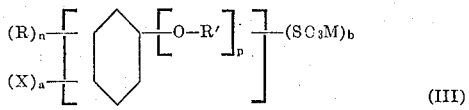

and

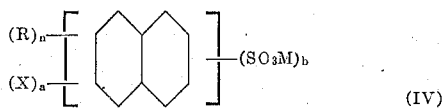

wherein the symbols R, R', $n$, $a$, $b$, and $p$ have the values assigned in Formulas I and II and M represents a member selected from the group consisting of hydrogen and an alkali metal. The reaction proceeds readily at from below room temperature to about 100° C. The reactants are preferably employed in stoichiometric amounts although excess copper compound can be used to insure complete reaction when the product is to be isolated. Less than stoichiometric amounts of copper result in a product containing an excess of the sulfonate or sulfonic acid reactant which is difficult to remove from the copper salt. However, the presence of such excess of the sulfonate or sulfonic acid reactant does not prevent the product from being effectively used as a catalyst, for example, in the hydrolysis of haloaromatic compounds, or Ullmann ether synthesis and although not normally desired it can be tolerated.

It is to be understood that substantially any water-soluble alkylated aromatic sulfonic acid or alkali metal salt falling within the generic Formulas III and IV can be employed to prepare the copper salt. Thus one can employ the alkylbenzene sulfonic acids and disulfonic acids, their nuclearly halogenated derivatives or their alkali metal salts such as propylbenzene sulfonic acid, propyl monochlorobenzene sulfonic acid, hexylbenzene sulfonic acid, hexyldibromobenzene sulfonic acid, nonylbenzene sulfonic acid, sodium nonylbenzene sulfonate, dodecylbenzene disulfonic acid, pentadecylmonochlorobenzene disulfonic acid and the like as well as their potassium, lithium, sodium and cesium salts; the alkylnaphthyl mono- and disulfonic acids, their nuclearly halogenated derivatives or their alkali metal salts such as propylnaphthyl sulfonic acid, butylmonochloronaphthyl disulfonic acid, sodium dodecyldibromonaphthyl disulfonic acid and the like as well as their potassium, lithium, sodium, or cesium salts; the alkyl di- and polyphenyl oxide mono- and polysulfonic acids, their nuclearly halogenated derivatives and their alkali metal salts such as, for example, dodecyldiphenyl oxide sulfonic acid, nonylmonobromodiphenyl oxide disulfonic acid, sodium pentadecylphenoxydiphenyl oxide trisulfonate, potassium dodecylmonochloro bis(phenoxy)diphenyl oxide tetrasulfonate and the like as well as their potassium, lithium, sodium and cesium salts.

The source of copper reactant can be copper or any copper compound such as copper oxide (CuO), copper nitrate ($Cu(NO_3)_2$), cuprous oxide ($Cu_2O$), and the like as well as cupric and cuprous mixtures.

It is to be further understood that the copper salt can be prepared by reacting the alkylated aromatic sulfonic acid with copper in the presence of strong caustic. This embodiment is more fully disclosed in the following examples.

The following examples illustrate the present invention but are not to be construed as limiting:

Example 1

Cupric oxide, 120 grams (1.35 moles), was added with stirring to a solution of 468 grams (0.94 mole) of dodecyldiphenyl oxide sulfonic acid in 2430 ml. of water. Stirring was continued until a constant pH was observed. The final pH of the solution was 4.7. The resulting solution was filtered to remove the excess copper oxide and the filtrate, a dark green liquid, was dried on a rotating drum dryer to obtain an olive green powder. As a result of these operations there was obtained 475 grams (0.85 mole) of copper dodecyldiphenyl oxide disulfonate representing a 90.5% conversion of the sulfonic acid to the copper salt.

Example 2

In a manner like that of Example 1, by substituting nonylbenzene sulfonic acid for the dodecyldiphenyl oxide disulfonic acid, there was obtained the copper di(nonylbenzene sulfonate) in near quantitative yields.

Other copper salts can be prepared by reacting:
Nonylnaphthyl sulfonic acid with copper oxide to obtain copper di(nonylnaphthylene sulfonate); or
Octadecyldiphenyl disulfonic acid with copper oxide to obtain copper octadecyldiphenyl disulfonate.

Example 3

Copper powder (255 grams) was added with stirring to 33 grams of sodium dodecyldiphenyl oxide disulfonate in 63.8 pounds of 20% aqueous sodium hydroxide. The resulting blue solution was filtered to remove excess copper powder. The solution analyzed ca. 0.017% copper.

This solution was used as a catalyst-containing composition in the caustic hydrolysis of halogenated aromatics in the manner of Example 4 (5).

*Example 4*

The following table illustrates the utility of the copper compounds prepared above as catalytic sources of copper in the caustic hydrolysis of halo diphenyl oxides.

The reactants below were run in one of the following pieces of equipment.

Reactor (A): A five-inch diameter four foot long Monel pressure reactor fitted with a stirrer and appropriate inlets and outlets, valves and recorders for controlling flow, and jacketed to provide heating and cooling means to control the temperature of the reaction medium.

Reactor (B): A one-eighth inch nominal diameter stainless steel coil 500 feet long, jacketed to provide heating and cooling means to control the temperature of the reaction medium.

The reactants, monobromodiphenyl oxide, aqueous 20% sodium hydroxide and copper catalyst (as copper powder, copper salt of an alkylated diphenyl oxide disulfonate, or the 20% caustic-Cu-disulfonate premix) were fed to the reactor at the flow rate indicated and the temperature controlled by heating or cooling. For purposes of comparison, certain of the runs were made in the absence of a copper-containing catalyst. The mole ratio of caustic to bromodiphenyl oxide was 2.2 to 1 in each run. The conditions of the reaction, form of copper catalyst and amount thereof as free or combined metallic copper, temperature, flow rate and products produced are set forth below:

| Catalyst, g. Cu/100 g. Br in BrDPO | Temp., °C. | Flow rate, lbs./hr. | Reactor | DPO-OH [1] | 4P3E [2] | Total | Remarks |
|---|---|---|---|---|---|---|---|
| (1) None | 320 | 148 | B | 17.2 | 0 | 17.2 | |
| (2) None | 280 | 72 | A | 25.4 | 10.7 | 36.1 | |
| (3) 0.63 [3] | 338 | 85 | A | 36.2 | 36.1 | 72.3 | Sludge in reactor. |
| (4) 0.63 [3] | 320 | 208 | A | 79.8 | 10.6 | 90.4 | Do. |
| (5) 0.094 [4] | 320 | 209 | A | 79.5 | 10.4 | 89.9 | No sludge. |
| (6) 0.12 [5] | 327 | 107 | A | 37.9 | 37.4 | 75.3 | Do. |

[1] DPO-OH = Hydroxy diphenyl oxide.
[2] 4P3E = Bis(phenoxy)diphenyl oxide.
[3] Copper powder.
[4] Premix of Example 3.
[5] Copper salt of dodecyldiphenyl oxide disulfonate of Example 2.

The following example illustrates the use of the copper compounds of the present invention as the catalytic copper source in the Ullman ether synthesis.

*Example 5*

Dry potassium phenoxyphenate is prepared by heating a mixture of 433 g. (2.3 moles) of hydroxydiphenyl oxide and 145 g. (2.2 moles) of 85% potassium hydroxide pellets at 150° with stirring, until the water formed in the reaction has all come off. Ten g. of copper salt of dodecyl monochloro diphenyl oxide sulfonate (prepared in the manner of Example 1) is then added and the temperature is raised to 220–225°. 236 g. (1 mole) of dibromobenzene is added dropwise at a rate which causes rapid reflux (the reaction is quite vigorous and the condenser must be ample). Heating is continued at 225° for two hours after dibromobenzene addition is finished. The crude reaction mixture is then cooled to about 80°, passed through a filter (it can be diluted with toluene if it is too viscous) and washed with an equal volume of water, which removes the KBr and unreacted potassium phenoxyphenate. To remove phenolic compounds, it is then washed with ½ its volume of 25% NaOH. Separation is aided by adding water until the caustic concentration is about 5%. The washed organic material is then distilled. There was obtained a yield of ca. 65% of bis(phenoxyphenoxy)benzene based on dibromobenzene consumed. No sludge was apparent in the reaction mixture whereas when copper dust was substituted, 5 g. as catalyst, a sludge formed and yields were no better than here obtained.

Thus it becomes evident that good yields and conversions are obtained using the catalyst of the present invention employing much less copper than heretofore thought necessary. Further the reactor requires little or no attention, i.e., periodic cleaning to remove the sludge, as when copper powder is used.

The new copper-containing catalysts provided by the invention can be employed with similar advantages in carrying out the hydrolysis of halo-aromatic compounds in general in aqueous alkaline media. For instance, they can be employed with advantages in carrying out hydrolysis of the mono- or di-halides, i.e., chlorides or bromines, of benzene to form phenol, diphenyl oxide, catechol, or resorcinol, etc., or in carrying out the hydrolysis of the mono- and di-halides (chlorides or bromides) of diphenyl oxides to produce phenoxyphenol, oxydiphenol and bis(phenoxy-phenyl)ether.

The alkylated diphenyl oxide sulfonates employed as starting materials to prepare the copper salts of the present invention are well known in the art. The alkylated polyphenyl ether sulfonates, such as alkylated bis(phenoxy)benzene sulfonate, can be prepared in the same manner as the diphenyl oxide sulfonates. By employing the appropriate starting materials such as for example a sodium phenolate and a halo diphenyl oxide then alkylating and sulfonating say in the manner of U.S. Patent No. 2,081,876.

We claim:

In the method of producing hydroxy aromatic compounds by the caustic hydrolysis of aromatic halides selected from the group consisting of mono and di chlorides and bromides of benzene, di-phenyloxide, catechol and resorcinol, in the presence of a copper catalyst and an aqueous alkaline media the improvement which comprises employing as catalyst the copper salt of an aromatic compound having the formula

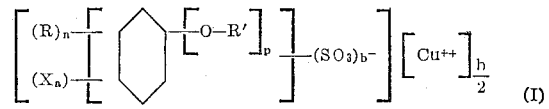

and

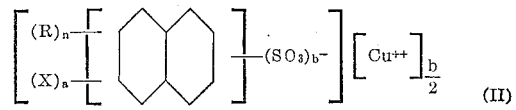

wherein R represents an aliphatic radical containing more than two carbon atoms and up to 15 carbon atoms, R' represents a member selected from the group consisting of phenylene and naphthalene radicals, $n$ represents an integer from 1 to 5, $a$ represents an integer from 0 to 2 inclusive, $b$ represents an integer from 1 to 2 when $p$ is 0, 1 to 3 when $p$ is 1, and 1 to $3+p$ when $p$ is greater than 1 $p$ represents an integer from 0 to 5 and X represents a halogen having an atomic number from 17 to 35 provided that the sum of $a$ and $n$ shall not exceed 5 in (I) when $p$ is 0.

No references cited.

BERNARD HELFIN, *Primary Examiner.*